Figure 1:
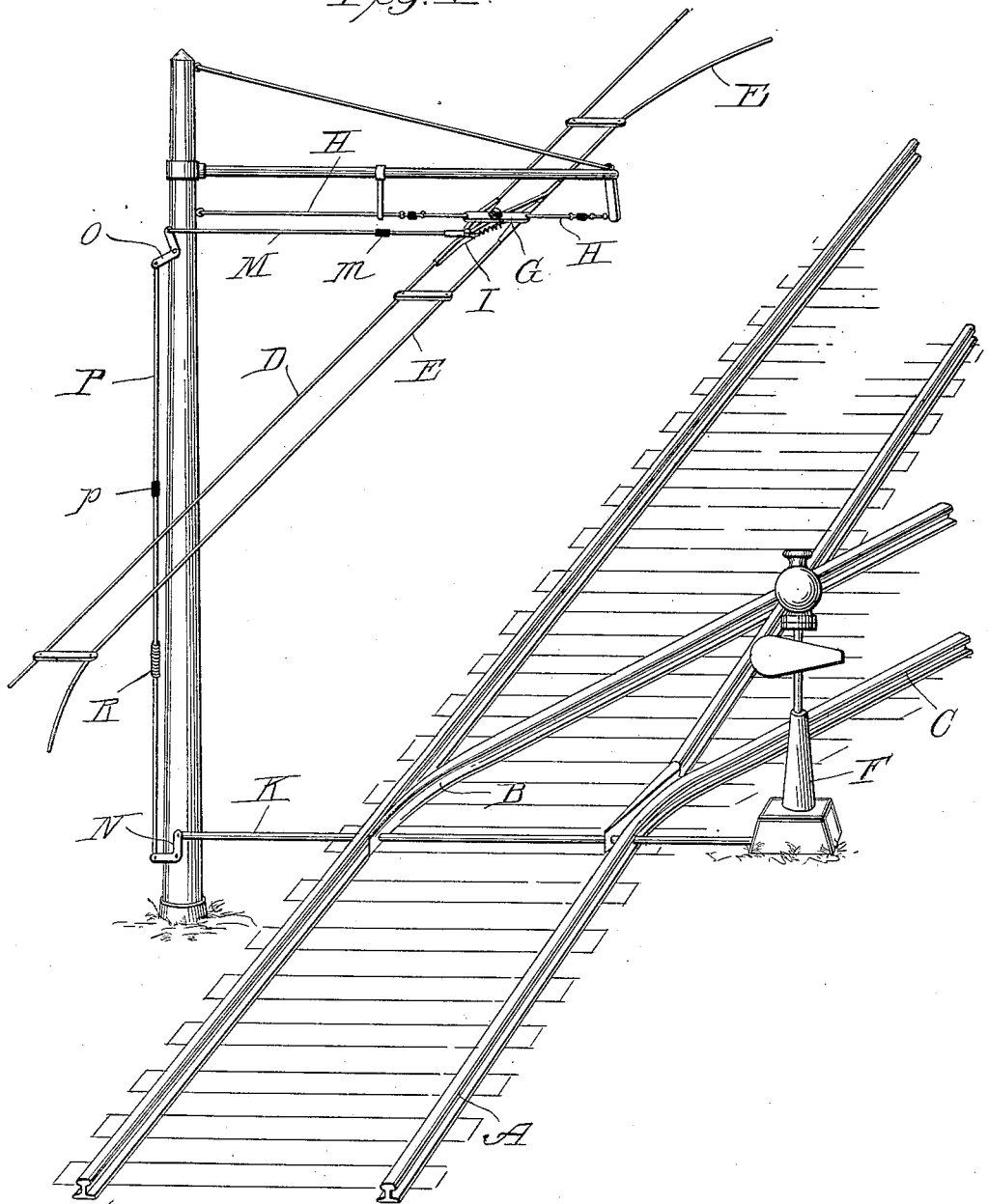

O. H. WEST.
TROLLEY SWITCH MECHANISM.
APPLICATION FILED JAN. 26, 1911.

1,041,929.

Patented Oct. 22, 1912.

2 SHEETS—SHEET 1.

WITNESSES

INVENTOR
Oscar H. West.
by Chamberlin & Freudenreich
attys

O. H. WEST.
TROLLEY SWITCH MECHANISM.
APPLICATION FILED JAN. 26, 1911.
1,041,929.
Patented Oct. 22, 1912.
2 SHEETS—SHEET 2.
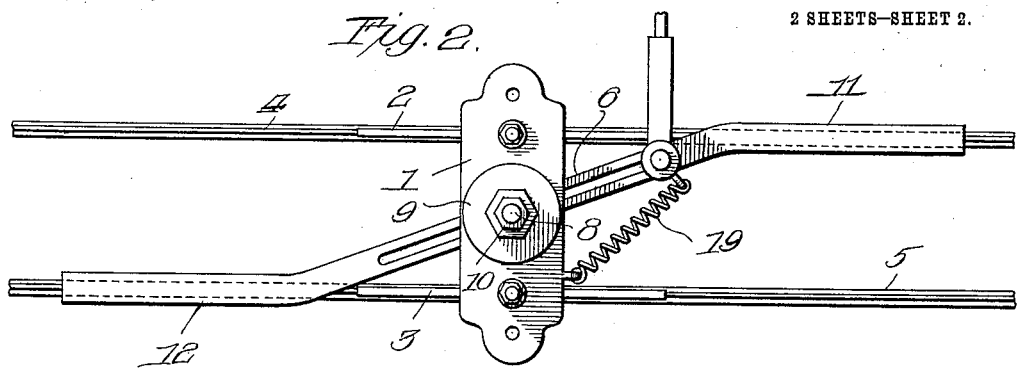
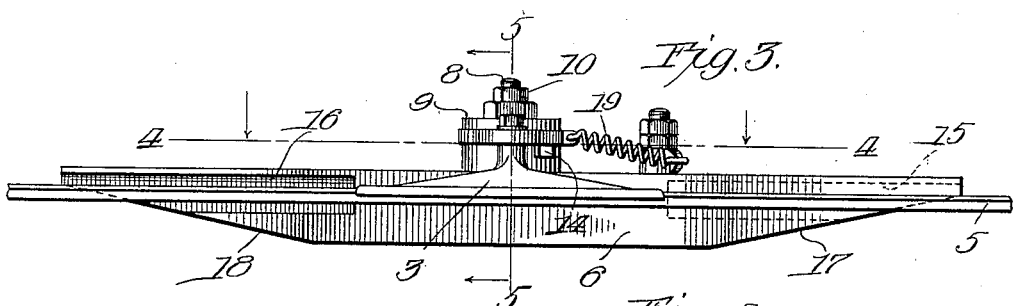
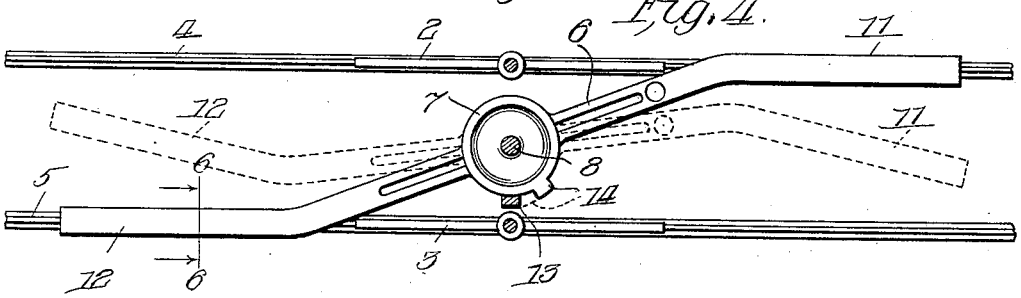
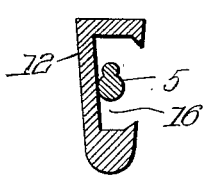
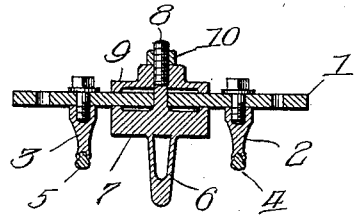
WITNESSES
INVENTOR
Oscar H. West
by Chamberlin & Freudenreich
attys

UNITED STATES PATENT OFFICE.

OSCAR H. WEST, OF GARY, INDIANA.

TROLLEY-SWITCH MECHANISM.

1,041,929.  Specification of Letters Patent.  Patented Oct. 22, 1912.

Application filed January 26, 1911. Serial No. 604,704.

*To all whom it may concern:*

Be it known that I, OSCAR H. WEST, a citizen of the United States, residing at Gary, county of Lake, State of Indiana, have invented a certain new and useful Improvement in Trolley-Switch Mechanism, and declare the following to be a full, clear, and exact description of the same, such as will enable others skilled in the art to which it pertains to make and use the same, reference being had to the accompanying drawings, which form a part of this specification.

It is an advantage to have means for automatically shifting the trolley wheel of an electric car from one trolley wire to the other without interrupting the circuit when a car passes over a switch from one track to another. This makes it unnecessary for the conductor to lean out at the back of the car, saving time and permitting the conductor to keep his attention on other matters; and, furthermore, it maintains the lighting circuit unbroken so that at night the head light and the lights in the interior of the car remain lighted during the switching operation. It is also desirable to have the trolley switch mechanism so constructed as to effect the transfer of a trolley wheel smoothly without normally interfering with the free passage of the trolley wheels when the switch is open.

My invention has for its object to produce a simple means for switching a trolley wheel or other current collector positively and smoothly from one current-supplying conductor to another when desired, at other times leaving the conductors without obstruction in the paths of collectors traveling along the same.

The various features of novelty whereby my invention is characterized will hereinafter be pointed out with particularity in the claims; but for a full understanding of my invention and of its objects and advantages, reference may be had to the following detailed description taken in connection with the accompanying drawings, wherein:

Figure 1, is a perspective view of a section of an overhead trolley railway at a switch therein, showing my improved trolley switch in position; Fig. 2, is a plan view of the switch alone on a large scale, the switch in Fig. 1 being adapted to switch to the right and that in Fig. 2 to switch to the left; Fig. 3 is a view looking upward in Fig. 2; Fig. 4 is a section on line 4—4 of Fig. 3; Fig. 5 is a section on line 5—5 of Fig. 3; and Fig. 6 is a section on line 6—6 of Fig. 4.

Referring to Fig. 1 of the drawings, A represents the tracks of the main line of an electric railway and B a switch leading to a branch or siding, C.

D and E are the overhead trolley wires for main line and the branch or siding, respectively.

F is a switch stand for actuating the switch C.

The trolley wires are suspended from a plate or bracket G carried by a transverse supporting wire H above the track switch. In accordance with my invention I mount on the member G a switch device I which is entirely independent of the trolley wires so that, when the device is in its inoperative position, indicated in dotted lines, the trolley wires are left clear and offer no obstruction to the passage of a trolley. Therefore, a car may pass over the line at a high rate of speed when the switch is open just as if there were no switch. It will thus be seen that the switch does not have imposed upon it any of the strains incident to supporting the siding wire, this wire passing uninterruptedly past the switch to a suitable anchoring point. Consequently the use of transverse guy wires to keep the switch above the center of the track is avoided, the switch would always work freely and easily, and the switch may be made comparatively light. In the arrangement shown, the trolley switch is connected with the track switch so that they move in unison, the trolley switch opening and closing as the track switch is opened and closed. The connection illustrated is mechanical; a rod K extends from the switch points to the pole L which supports trolley wires at this point; a rod M extends from the trolley switch to the upper end of the pole L; the ends of rods K and M are each connected to one arm of a bell crank lever mounted on the pole, the levers being indicated at N and O, respectively; and a rod P extends between and is connected to the other two arms of the bell crank levers. The members M and P are provided with insulators *m* and *p*, respectively, to prevent grounding the trolley wires. I also prefer to place a resilient section in the connection between the track switch and the trolley switch so as to insure that the trolley switch will be held tightly against the wires when the track switch is closed. In the arrangement shown the rod P is made in two pieces connected together by a spring R. In the drawings the track switch is closed so that a car traveling along the main line will be directed into the branch or siding when it reaches the switch. The trolley switch is now in position to guide a trolley wheel from the main line trolley wire to the other. When the track switch is thrown so as to leave the main track clear, the trolley switch assumes the position indicated in dotted lines and lies entirely out of the path of the trolley wheels passing along the main line.

In Figs. 2–6, I have shown the trolley switch in detail, the switch being constructed to direct a trolley wheel toward the left of the wire of the main line in Fig. 1 instead of toward the right as illustrated in that view. Referring to Figs. 2–6, 1 represents a plate or bracket having separate hangers, 2 and 3 suspended therefrom. The hangers support two trolley wires, 4 and 5. The switch itself comprises an arm 6 having a disk-like hub 7 at the middle and an integral stud 8 projecting upwardly from the axis of the hub through the center of the plate or bracket. The arm is secured to the bracket by a nut 9 screwed upon the stud 8 and having a broad disk-like base which gives a broad bearing surface and prevents the arm from tilting. A lock-nut 10 above the nut 9 prevents the latter from working loose. The ends of the arm are deflected laterally in opposite directions, as indicated at 11 and 12, so as to lie parallel with the two trolley wires when the arm is swung into the position shown in full lines in the drawings. The hub 7 and the bracket are provided with lugs, 13 and 14, respectively, which engage with each other when the trolley switch is opened and prevent it from swinging too far in the backward direction. The arm is deep in the vertical direction so as to extend far enough below the trolley wires to carry the flanges of a trolley wheel clear of the trolley wires during the switching process. The end portions of the arms are grooved longitudinally in their outer faces at 15 and 16 for the reception of the trolley wires when the switch is closed. The end portions of the arms are also beveled on their under sides, as at 17 and 18, the bevels beginning at points above the normal place of the under face of the trolley wires at the extreme ends of the arms and continuing downward gradually until the full depth of the arm is reached. It will thus be seen that a trolley wheel running toward the left on wire 4 or toward the right on wire 5, when the switch is closed, rides gently upon the adjacent end of the arm, is carried down clear of the wire before a lateral movement begins, travels along the arm toward the other wire, and finally rides up the incline at the other end of the arm and passes upon the latter wire; the process of transfer being smooth and gentle and yet in such a positive manner that there can be no failure. By making the switch of good conducting material, such as brass, the continuity of the trolley circuit remains uninterrupted while the wheel is passing from one wire to the other. When the arm is turned back until the shoulders 13 and 14 engage with each other, as indicated in dotted lines in Fig. 4, both trolley wires are left entirely clear and the trolley wheel travels along the wires just as if the switch were not there. If desired, a spring, such as indicated at 19, may be employed to hold the switch arm in its inoperative position when free to do so. This is of advantage even where a positive operating means for movements in both directions is provided; for, in case of a break in the actuating means, the trolley switch will automatically be turned out of the way and leave the line clear.

It will be seen that the switch does not have imposed on it the strain which is incident to constructions wherein the end of siding wire terminates in the switch, thus making it unnecessary to use transverse guy wires to keep the switch above the center of the track.

While I have described only a single preferred form of my invention, I do not desire to be limited to the exact details thus described, but intend covering all constructions which come within the terms employed in the definitions of my invention constituting the appended claims.

I claim:

1. In combination, two separated current-supplying conductors, a movable switch device independent of the conductors for guiding a current-collector from one conductor to the other, and controlling means for said device arranged to move it between a position wherein it bridges the space between the conductors and a position wherein it leaves both conductors clear and unobstructed.

2. In combination, two separated current-supplying conductors, a switch member pivoted between its ends at a point between the conductors and adapted to switch a current-collector from one conductor to the other, and controlling means arranged to oscillate said member between a position in which its ends lie adjacent to said conductors and a position wherein its ends are spaced apart from the conductors so as to leave the latter clear for the passage of a current collector.

3. In combination, two separated current-supplying conductors, a switch member pivoted between its ends at a point between the conductors and adapted to guide a current-collector from one conductor to the other, means for normally holding said member in a position wherein its ends are spaced apart from the conductors so as to leave the latter clear for the passage of current collectors, and means for swinging said member into a position wherein it bridges the space between the conductors so as to switch a current-collector from one conductor to the other when it reaches the switch member.

4. In combination, a bracket, two trolley wires supported side by side beneath said bracket, an arm pivoted midway between its ends to the underside of the bracket at a point midway between the wires so as to be movable in the plane of the wires, the ends of the arm being deflected laterally in opposite directions so as to lie parallel with the wires when the arm is swung to bring its ends into engagement with the wires.

5. In combination, a bracket, two trolley wires supported on the underside of said bracket, an arm pivoted to the under side of the bracket so as to be movable in the plane of the wires, the ends of the arm being deflected laterally in opposite directions so as to lie parallel with the wires when the arm is swung to bring its ends into engagement with the wires, the outer faces of the deflected portions of the arm being recessed to receive the wires, and the ends of the arm being beveled on the under side so as to afford cam-faces beginning at points above the bottoms of the recesses at the extreme ends of the arm and extending considerably below the recesses.

6. In combination, a bracket, two trolley wires supported on the underside of said bracket, an arm pivoted between its ends to the under side of the bracket at a point between the wires so as to be movable in the plane of the wires, the ends of the arm being shaped to guide a trolley wheel from one wire to the other when the arm is swung into contact with both wires, and means for normally holding said arm in an intermediate position out of contact with either of said wires.

7. In combination, a bracket, two trolley wires supported on the underside of said bracket, an arm pivoted between its ends to the under side of the bracket at a point between the wires so as to be movable in the plane of the wires, the ends of the arm being shaped to guide a trolley wheel from one wire to the other when the arm is swung into contact with both wires, shoulders on the arm and on the bracket adapted to engage with each other when the arm is in an intermediate position clear of the wires, a spring for normally holding said arm in said intermediate position, and means for swinging said arm into operative switching relation with respect to said wires.

8. In a device of the character described, a flat plate, supports on said plate for supporting two trolley wires, a switch arm lying on the underside of the plate between said supports, said switch arm having on its upper side at a point between its ends a flat hub of considerable diameter, a post extending up from the center of the hub through said plate, and a nut of considerable diameter arranged on said post above the plate.

In testimony whereof, I sign this specification in the presence of two witnesses.

OSCAR H. WEST.

Witnesses:
Wm. F. Freudenreich,
H. S. Gaither.

Copies of this patent may be obtained for five cents each, by addressing the "Commissioner of Patents, Washington, D. C."